Figure 1:
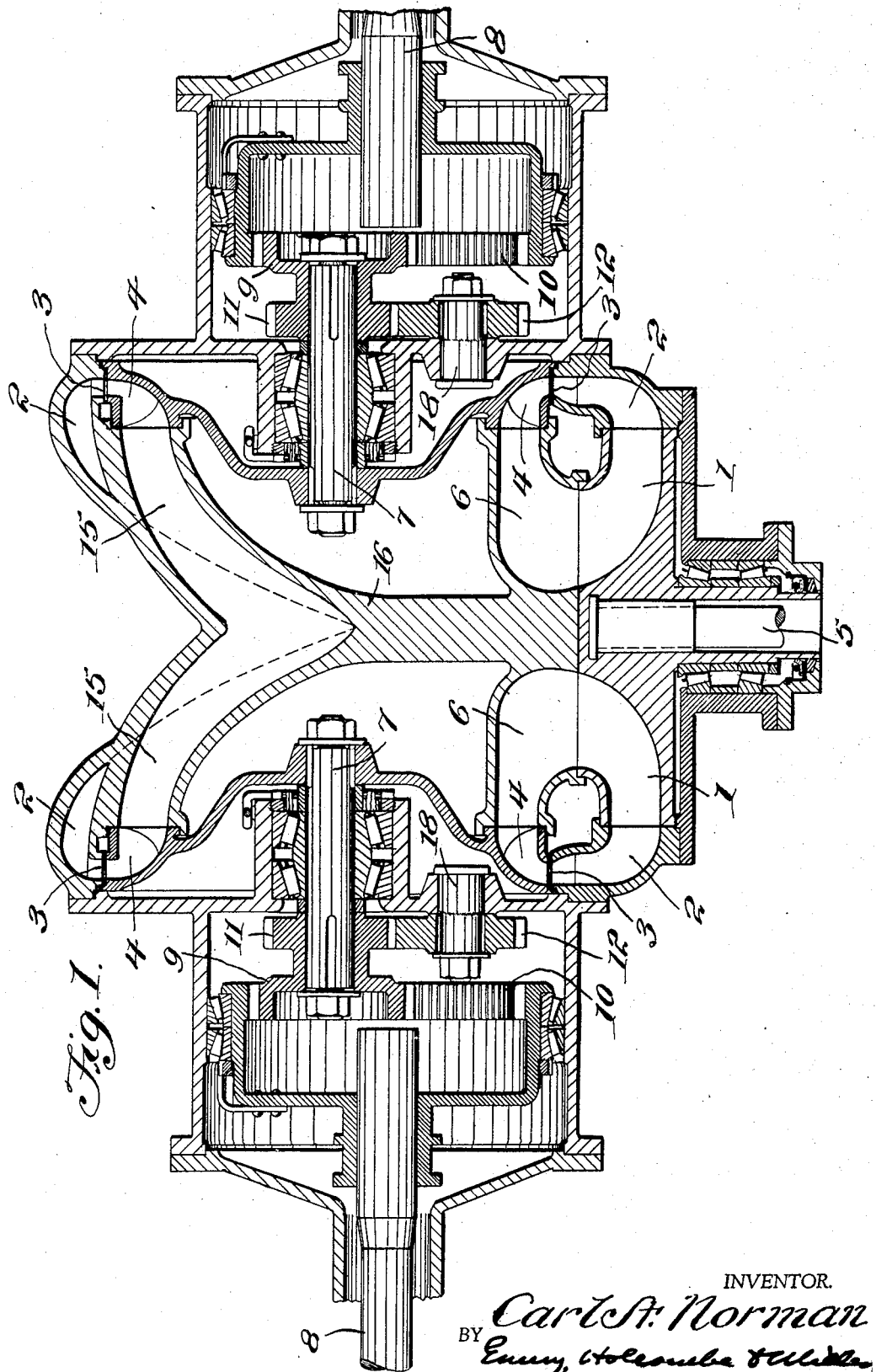

July 4, 1944.  C. A. NORMAN  2,353,060

HYDRAULIC TRANSMISSION AND DIFFERENTIAL GEARING

Filed Aug. 4, 1941  2 Sheets-Sheet 1

INVENTOR.
Carl A. Norman
BY Emery, Holcombe & Whittier
ATTORNEYS

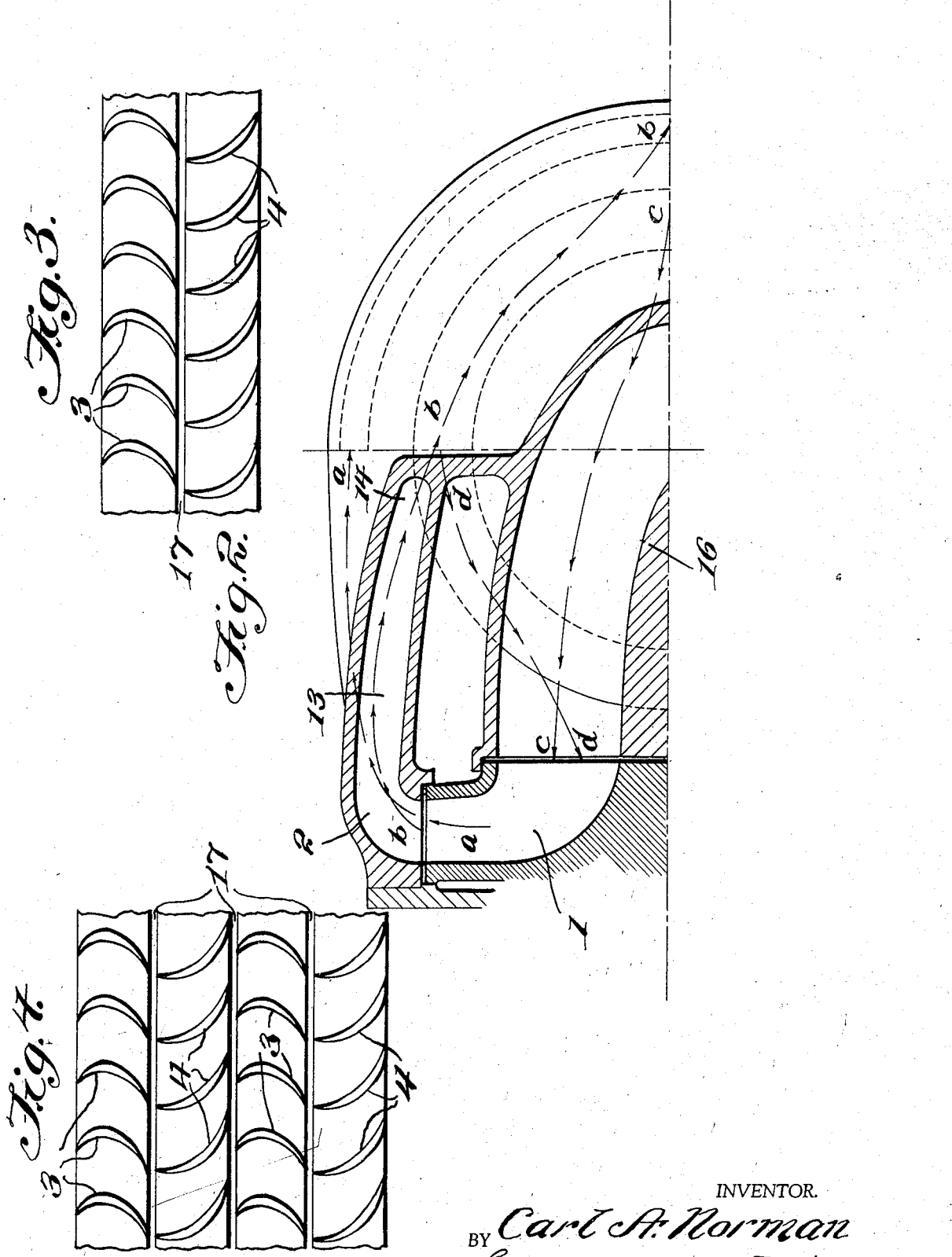

Patented July 4, 1944

2,353,060

UNITED STATES PATENT OFFICE 2,353,060

HYDRAULIC TRANSMISSION AND DIFFERENTIAL GEARING

Carl A. Norman, Columbus, Ohio

Application August 4, 1941, Serial No. 405,427

1 Claim. (Cl. 74—189.5)

This invention relates to automatic speed changing and torque adjustment power transmission devices of the hydraulic type, particularly adapted to be embodied in the driving axle of an automotive vehicle to take the place of the angle gearing and differential gearing now commonly employed in such vehicles.

There are at the present time a great many hydraulic transmissions of turbo type, that is, comprising pump and turbine elements on the driving and driven shafts, respectively, provided with automatic torque and speed adjustment for accommodating varying resistances on the driven shaft and varying power inputs on the driving shaft.

Almost universally the fundamental principle in these transmissions is to utilize the residual velocity from the first turbine element either in successive turbine elements or in producing a head or an entrance velocity for the main pump element. The path from the pump elements to the turbine elements and back is made as short as possible and usually appears in a section containing the axis of rotation to be approximately elliptical or circular. This is illustrated by the closed path formed by the passages 1—2—3—4—6 immediately adjoining the pump impeller on Figure 1 of the accompanying drawings. In a typical transmission device of this type, a stationary housing 2 adjoins the impeller and contains guide vanes 3 for discharging liquid on the turbine element 4. The liquid returns through the return passage 6 to the pump inlet.

It should be noted, however, that while this path looks very smooth in the view presented, it is not nearly so smooth when viewed in the plane of the bucket profiles, as illustrated in Figures 3 and 4. The stationary guide vanes 3 may present a sharp turn in the path so as to make the liquid impinge on the turbine buckets 4 in the desired manner. As a rule the vanes or buckets are curved not only in one plane, but in two or more, as illustrated by the buckets in an ordinary Francis turbine wheel, which the turbine element 4 in Fig. 1 may well resemble. The real path of the liquid may therefore be extremely tortuous. And this is particularly true with multi-stage arrangements as illustrated in Fig. 4 mostly found in existing automatic turbo-transmissions.

For this reason a fundamentally different approach is here proposed. This approach is based on two main considerations. The first is that since energy is proportional to the square of the velocity, a very considerable residual or discharge velocity from a turbine element may yet represent a comparatively insignificant energy loss. Thus a residual velocity of as much as half the entrance velocity would represent an energy loss of only 25 per cent. It is therefore possible to let the turbine element rotate at a speed much below that of most efficient energy utilization and yet secure a fair efficiency. For example, a speed reduction corresponding to that of the second speed as compared with the direct drive in an ordinary passenger automobile would not mean a very great residual energy loss should an automatic turbo-transmission of any one of most of the existing types be substituted for the mechanical reduction gearing now generally used.

The second consideration which has influenced the design herewith submitted is that, according to more recent investigations, a great many impact and turbulence losses due to theoretically incorrect exit and entrance angles may be substantially reduced by adopting a fairly large clearance between the stationary and the running vanes so as to enable the liquid to find its own path of least resistance. Thus the clearance between stationary element 3 and running element 4 in Figures 1 and 3 should be fairly large.

By observing these two considerations a simplification of many existing designs is possible with a reduction in numbers of stationary and running elements, and it becomes possible to introduce combinations of functions in a way not formerly thought possible. Such a combination is herewith presented as my invention. It combines the automatic turbo-transmission and the differential gearing into one unit.

The arrangement is shown in sectional plan in Fig. 1, the section line being taken through the axis of the driving and driven elements, and in partial vertical section to illustrate flow in Fig. 2, the section line being taken through the axis of the driving element at right angles to the driven element. A clarifying diagram of the blades and vanes is given in Figure 3. Figure 4 illustrates a modification.

Referring to the form of invention shown in Figure 1, a pump impeller having radial flow passages is mounted on the propeller shaft 5, which receives the drive from the engine. Suitable bearings are provided for mounting the propeller shaft in the main supporting housing. The impeller discharges liquid into the stationary housing 2 containing guide vanes 3. These guide vanes are arranged on full circles with the intermediate axle shafts 7 as centers. The shafts themselves carry turbines with buckets or vanes 4. These turbines drive the shafts 7 and through them and gearing 9—10 or 11—12—10, the wheel axles 8 are driven. The shafts 7 and 8 are mounted on suitable antifriction bearings supported in the main housing.

In the regions immediately adjoining the pump impeller the circulation is in the short closed circuit already described. It should be understood, however, that from the pump end to the end farthest away from the pump the housing 2 branches to the right and left so as to present full cylindrical discharge openings facing the turbine runners as in an ordinary Francis turbine. The flow is in part suggested by flow lines in Figure 2. It is proposed, for instance, that the left half of the pump circumference supplies the whole left turbine, and the right half of the pump circumference the whole right turbine. To illustrate this the flow line b—b is drawn from the top of the impeller to the extreme far end of the turbine housing, and the flow line a—a from an intermediate point in the quadrant adjoining the top of the impeller to the top vertical point on the turbine. Similarly, the return from the extreme far end of the turbine to the top of the mean inlet circle is illustrated by flow line c—c, while the return from the top vertical point to an intermediate point on the inlet circle is illustrated by the flow line d—d.

To accomplish this the stationary housing, as shown in Figure 2, is shaped so as to merge or pass over into a flat extension at the point 13, and forks into two branches at the point 14. The forked passage emerges at the points 2 at the end farthest from the pump in Figure 1. Correspondingly, the flow returns through forked passages 15 in Fig. 1 and over a central core 16, as shown also in Fig. 2. Wide clearances 17 are provided between the guide vanes 3 and running vanes 4, as illustrated in Figs. 3 and 4, to enable the device to operate more efficiently at various speeds.

The device may be made to operate as an automatic transmission and a positive-drive differential gear in the following manner: when it operates as a transmission, the right and left turbines run at substantially the same speed, the velocity and pressure head delivered by the pump being converted into a torque reaction on the turbines. The greater the reduction, the slower the turbines run relatively to the impeller. This device, however, also permits the two wheel turbines to run at different speeds as does any differential gear of the automobile driving axle type. In this case the greater hydraulic torque comes on the turbine that runs slower, that is, on the wheel that retains traction, while a slipping or racing wheel receives a smaller torque the faster it runs. This is, of course, the advantage aimed at by all positive drive differential gearing designs.

The means for reversing the direction of rotation of the turbines are not an essential part of this invention, but are shown here merely to make clear that such reversal can easily be provided for. The means here suggested consist of an internal gear 10 (see Fig. 1), which can slide axially. In the position shown it engages directly with a pinion on the intermediate shaft 7. To reverse, the internal gear is shifted over toward the center of the device so as to engage pinion 12 driven by pinion 11 on the intermediate shaft 18.

While I have here shown a single stage turbine only, it is of course readily possible to arrange two or more stages before discharge into passages 15.

The characteristic features of my invention include the provision in an automatically self-adjusting hydraulic turbo-differential gearing relying for efficiency on ample clearances between stationary and running elements not on a multiplicity of stages or on the shortest possible circulatory path of carefully designed long sweep passages, and vane angles adjusted to a certain dominating running speed so that less common speeds above or below this dominating speed can be maintained without serious turbulence, impact or residual velocity losses.

I claim as my invention:

A combined automatic speed changing and differential gearing of the fluid pressure type comprising a driving element and two driven elements arranged symmetrically to the right and left of the driving element and provided with fluid circulating channels, and guide vanes for the driven elements arranged with their axes in parallel planes, the axis of said driving element being at right angles to the axes of said driven elements, a casing for said elements having symmetrical fluid circulating channels provided with guide vanes cooperating with said driven vanes and divided into two systems disposed on opposite sides of a plane passing through the axis of said driving element perpendicular to the axis of said driven elements, said guides being circumferential in extent and spaced from said vanes to provide wide clearances therebetween and increase the efficiency of operation under varying speed ratios thereof, a power driven shaft for rotating said driving element, power distributing shafts operatively connected to said driven elements, respectively, said driven elements and power distributing shafts being connected by speed reduction and reversing gearing mounted in said casing, and means for shifting said gearing from forward to backward direction and vice versa.

CARL A. NORMAN.